United States Patent
Ozaki

(10) Patent No.: US 8,339,252 B2
(45) Date of Patent: Dec. 25, 2012

(54) BLIND SPOT DISPLAY DEVICE AND DRIVING SUPPORT DEVICE

(75) Inventor: Osamu Ozaki, Mishima (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 207 days.

(21) Appl. No.: 12/995,903

(22) PCT Filed: Jun. 23, 2009

(86) PCT No.: PCT/JP2009/061409
§ 371 (c)(1),
(2), (4) Date: Dec. 2, 2010

(87) PCT Pub. No.: WO2009/157446
PCT Pub. Date: Dec. 30, 2009

(65) Prior Publication Data
US 2011/0090073 A1   Apr. 21, 2011

(30) Foreign Application Priority Data
Jun. 24, 2008   (JP) .................................. 2008-164901

(51) Int. Cl.
*B60Q 1/00* (2006.01)
(52) U.S. Cl. ........................................ 340/435; 340/438
(58) Field of Classification Search .................. 340/435, 340/438, 425.5; 359/843
See application file for complete search history.

(56) References Cited

U.S. PATENT DOCUMENTS

| | | | |
|---|---|---|---|
| 2003/0108222 | A1 | 6/2003 | Sato et al. |
| 2004/0004541 | A1* | 1/2004 | Hong .............................. 340/435 |
| 2007/0081262 | A1 | 4/2007 | Oizumi et al. |

FOREIGN PATENT DOCUMENTS

| | | |
|---|---|---|
| JP | 7 302325 | 11/1995 |
| JP | 2003 244688 | 8/2003 |
| JP | 2004 034957 | 2/2004 |
| JP | 2005 184225 | 7/2005 |
| JP | 2006 297762 | 10/2005 |
| JP | 2006 42147 | 2/2006 |
| JP | 2006 232212 | 9/2006 |

(Continued)

OTHER PUBLICATIONS

International Search Report issued Aug. 25, 2009 in PCT/JP09/061409 filed Jun. 23, 2009.

(Continued)

*Primary Examiner* — Shirley Lu
(74) *Attorney, Agent, or Firm* — Oblon, Spivak, McClelland, Maier & Neustadt, L.L.P.

(57) ABSTRACT

Disclosed is a blind spot display device which enables a driver to check the image of a blind spot area at required timing and can prevent the visual distraction of the driver due to display of unnecessary images, ensuring that the driver is sufficiently attentive during driving. On the basis of the traveling state of a vehicle estimated by a traveling state estimation section, a right display and a left display switch display and non-display of the image of the blind spot area, and the right attention drawing section or the left attention drawing section corresponding to the display displaying the image draws the attention of the driver. On the basis of the traveling state, the image is displayed only when necessary, and is not displayed when unnecessary.

8 Claims, 13 Drawing Sheets

FOREIGN PATENT DOCUMENTS

| | | |
|---|---|---|
| JP | 2006 303583 | 11/2006 |
| JP | 2007 096638 | 4/2007 |
| JP | 2007 104538 | 4/2007 |
| JP | 2007 122536 | 5/2007 |
| JP | 2007 299050 | 11/2007 |

OTHER PUBLICATIONS

International Preliminary Report on Patentability issued Mar. 10, 2011, in PCT/JP2009/064109.

* cited by examiner

Fig.13

|  |  | FACE DIRECTION OF DRIVER | | |
|---|---|---|---|---|
|  |  | LEFT DIRECTION | RIGHT DIRECTION | OTHERS |
| SWITCHING PATTERN BASED ON ESTIMATION RESULT | LEFT:DISPLAY RIGHT:DISPLAY | LEFT AND RIGHT | LEFT AND RIGHT | LEFT AND RIGHT |
| | LEFT:DISPLAY RIGHT:NON-DISPLAY | LEFT | LEFT AND RIGHT | LEFT |
| | LEFT:NON-DISPLAY RIGHT:DISPLAY | LEFT AND RIGHT | RIGHT | RIGHT |
| | LEFT:NON-DISPLAY RIGHT:NON-DISPLAY | — | — | — |

BLIND SPOT DISPLAY DEVICE AND DRIVING SUPPORT DEVICE

TECHNICAL FIELD

The present invention relates to a blind spot display device which displays the image of a blind spot area by a pillar, and a driving support device.

BACKGROUND ART

For some time, a blind spot display device has been known which displays the image of a blind spot area, for example, as described in Japanese Unexamined Patent Application Publication No. 2007-104538. This blind spot display device includes a camera which photographs the image of a blind spot area caused by a front pillar (A-pillar), an image control device which analyzes, converts, and processes image information from the camera, and a monitor (image display unit) which is provided at the front pillar in a vehicle to display the image of the blind spot area.

CITATION LIST

Patent Literature

[Patent Literature 1] Japanese Unexamined Patent Application Publication No. 2007-104538

SUMMARY OF INVENTION

Technical Problem

In such a blind spot display device, however, even when the image of the blind spot area is displayed on the monitor, there is a possibility that a driver may not check the image of the blind spot area at required timing. Meanwhile, the known blind spot display device displays the image even when unnecessary, regardless of the traveling state of the vehicle. Depending on the traveling state of the vehicle, the image displayed on the monitor may cause the visual distraction of the driver. For this reason, there is a possibility that the driver will be less attentive during driving.

The invention has been finalized in order to solve such a problem. An object of the invention is to provide a blind spot display device which enables a driver to check the image of a blind spot area at required timing and prevents visual distraction due to an unnecessary image, ensuring that the driver is sufficiently attentive during driving. Another object of the invention is to provide a driving support device which directs the attention of the driver to the blind spot area at required timing, ensuring that the driver is sufficiently attentive during driving.

Solution to Problem

A blind spot display device according to the invention includes image display units which are respectively provided inside a pair of left and right front pillars in a vehicle, and display the image of a blind spot area outside the vehicle caused by the field of view of a driver being blocked by each front pillar, attention drawing units which are provided correspondingly to the image display units, and draw the attention of the driver such that the driver looks at the image, and a traveling state estimation unit which estimates the traveling state of the vehicle. The image display units switch display and non-display of the image on the basis of the traveling state estimated by the traveling state estimation unit. The attention drawing unit corresponding to the image display unit displaying the image draws the attention of the driver.

In this blind spot display device, the image display units can switch display and non-display of the image of the blind spot area on the basis of the traveling state of the vehicle estimated by the traveling state estimation unit. The attention drawing unit corresponding to the image display unit displaying the image draws the attention of the driver. Thus, depending on the traveling state of the vehicle, when it is not necessary to display images on both image display units, the blind spot display device can put both image display units in a non-display state. Therefore, the blind spot display device can ensure the attention of the driver during driving. The blind spot display device displays images on both image display units and draws the attention of the driver with both attention drawing units only when necessary. Therefore, the blind spot display device enables the driver to check an image reliably. When it is necessary for the driver to look at only an image on one side depending on the traveling state of the vehicle, the blind spot display device displays an image on only one image display unit and draws the attention of the driver with only one attention drawing unit. Therefore, the blind spot display device enables the driver to look at an image reliably, and puts the other unnecessary image display unit in the non-display state, preventing the driver from being inattentive. As a result, the blind spot display device enables the driver to check the image of the blind spot area at required timing and can prevent the visual distraction of the driver due to display of an unnecessary image, ensuring that the driver is sufficiently attentive during driving.

In the blind spot display device according to the invention, it is preferable that the attention drawing units draw the attention of the driver on the basis of an obstacle in the blind spot area. The blind spot display device draws the attention of the driver with the attention drawing units on the basis of the obstacle in the blind spot area. When there is no obstacle in the blind spot area, the blind spot display device does not draw the attention of the driver with the attention drawing units. Therefore, the blind spot display device can prevent the attentiveness of the driver from being decreased due to unnecessary drawing of attention.

In the blind spot display device according to the invention, it is preferable that the traveling state estimation unit estimates the traveling direction of the vehicle, and the image display unit in the traveling direction displays an image and the other image display unit does not display an image. The blind spot display device displays the image of the blind spot area on the image display unit which is present in the traveling direction estimated by the traveling state estimation unit. Thus, when the vehicle turns right or left, or when the vehicle makes a sharp curve, the blind spot display device can ensure the field of view in the traveling direction reliably without imposing a driving burden on the driver, such as body movement or weight shifting so as to ensure the field of view. The blind spot display device puts the other image display unit in the non-display state, preventing the visual distraction of the driver due to display of unnecessary images. Therefore, the blind spot display device can prevent the attentiveness of the driver from being decreased.

Specifically, it is preferable that the traveling state estimation unit estimates the traveling direction on the basis of the blink states of blinkers, a vehicle speed, a steering angle, or a lateral acceleration.

In the blind spot display device according to the invention, it is preferable that, when the vehicle speed is smaller than a predetermined threshold value, the traveling state estimation unit estimates that the vehicle is in a low-speed state, and when the traveling state estimation unit has estimated that the vehicle is in the low-speed state, the image display units display images. For example, when the vehicle departs from a parking position, that is, when the vehicle is in the low-speed state, it is necessary for the driver to check safety on the left and right sides. In such a case, the blind spot display device displays the image of the blind spot area on both image display units, ensuring safety at the time of the departure of the vehicle.

In the blind spot display device according to the invention, it is preferable that, when the vehicle speed is equal to or higher than a predetermined threshold value and the steering angle is equal to or smaller than a predetermined angle the traveling state estimation unit estimates that the vehicle is in a high-speed straight-traveling state, and when the traveling state estimation unit has estimated that the vehicle is in the high-speed traveling state, the image display units are put in the non-display state. When the vehicle is in the high-speed straight-traveling state, the contents of the images on the image display units are switched at high speed. At this time, the driver is unlikely to discriminate between the contents displayed on the image display units. When the vehicle is in the high-speed straight-traveling state, the blind spot display device puts both image display units in the non-display state, such that the driver can concentrate his/her attention on driving.

In the blind spot display device according to the invention, it is preferable that the traveling state estimation unit estimates whether the vehicle is in a reversing state or not, and when the traveling state estimation unit has estimated that the vehicle is in the reversing state, the image display units are in the non-display state. When the vehicle is in the reversing state, the driver is looking backward. Thus, when the vehicle is in the reversing state, the blind spot display device puts both image displays units in the non-display state, suppressing wasteful power consumption.

A driving support device according to the invention includes transmitting units which are respectively provided inside a pair of left and right pillars, and transmit the state of a blind spot area outside a vehicle caused by the field of view of a driver being blocked by each pillar, and a traveling state estimation unit which estimates the traveling state of the vehicle. The transmitting units switch transmission and non-transmission on the basis of the traveling state estimated by the traveling state estimation unit.

In the driving support device according to the invention, the transmitting units can transmit the state of the blind spot area to the driver. The transmitting units can also switch transmission and non-transmission on the basis of the traveling state estimated by the traveling state estimation unit. Therefore, the driving support device according to the invention directs attention of the driver to the blind spot area at required timing, ensuring that the driver is sufficiently attentive during driving.

Advantageous Effects of Invention

According to the invention, it is possible to enable the driver to check the image of the blind spot area at required timing, and to prevent the visual distraction of the driver due to display of unnecessary images, ensuring that the driver is sufficiently attentive during driving.

BRIEF DESCRIPTION OF DRAWINGS

FIG. 13 is a table showing display switching patterns based on an estimation result and directions in which a driver is facing.

DESCRIPTION OF EMBODIMENTS

Hereinafter, a preferred embodiment of a blind spot display device according to the invention will be described in detail with reference to the drawings. In this specification, the traveling direction of a vehicle is referred to as "forward", left and right directions when viewed from the inside of the vehicle are referred to as "left" and "right. Then, the words "front", "back", "left", and "right" indicating directions are used.

Figure 1:
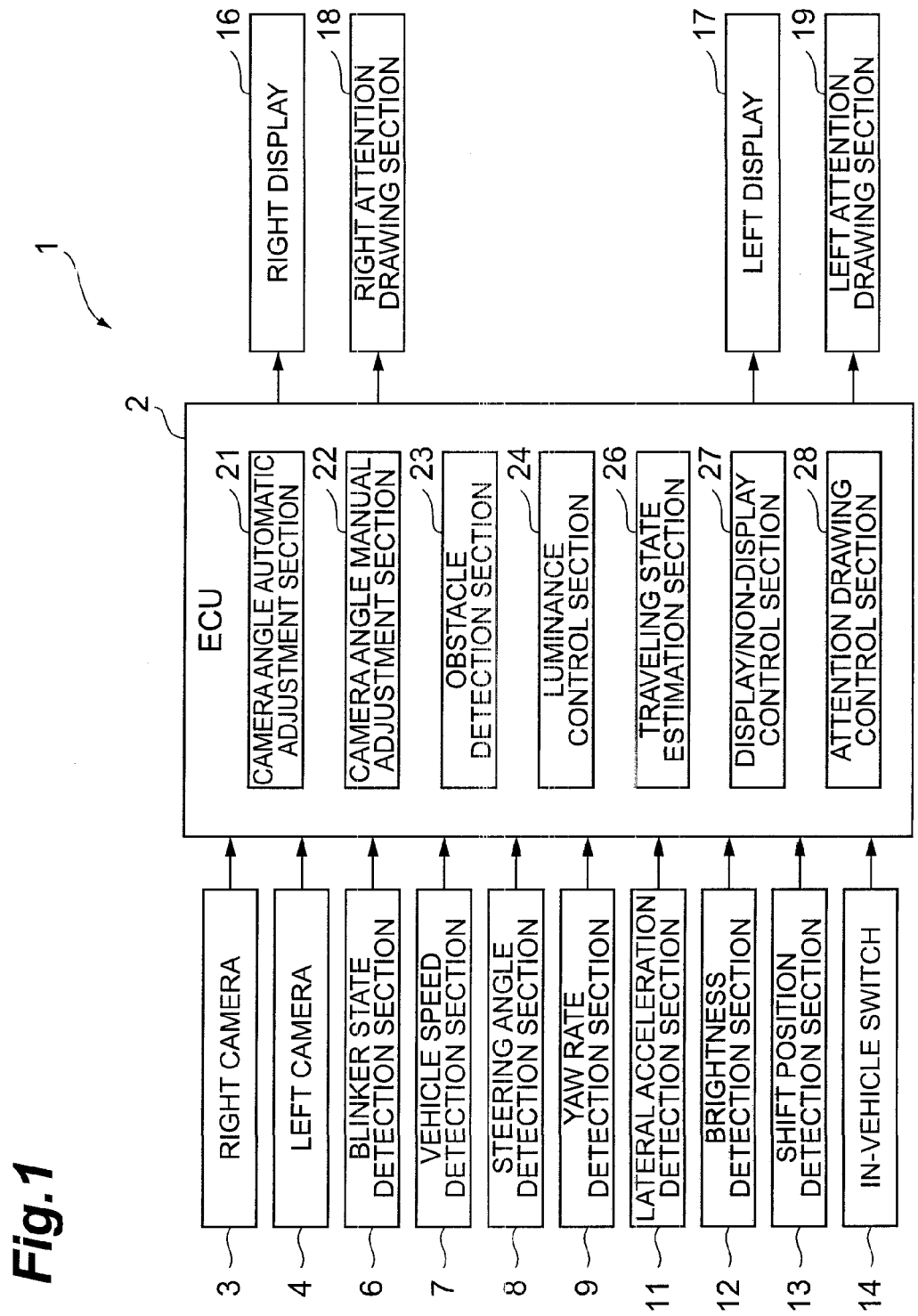
FIG. 1 is a diagram showing, the block configuration of a blind spot display device according to an embodiment of the invention.
Figure 2:
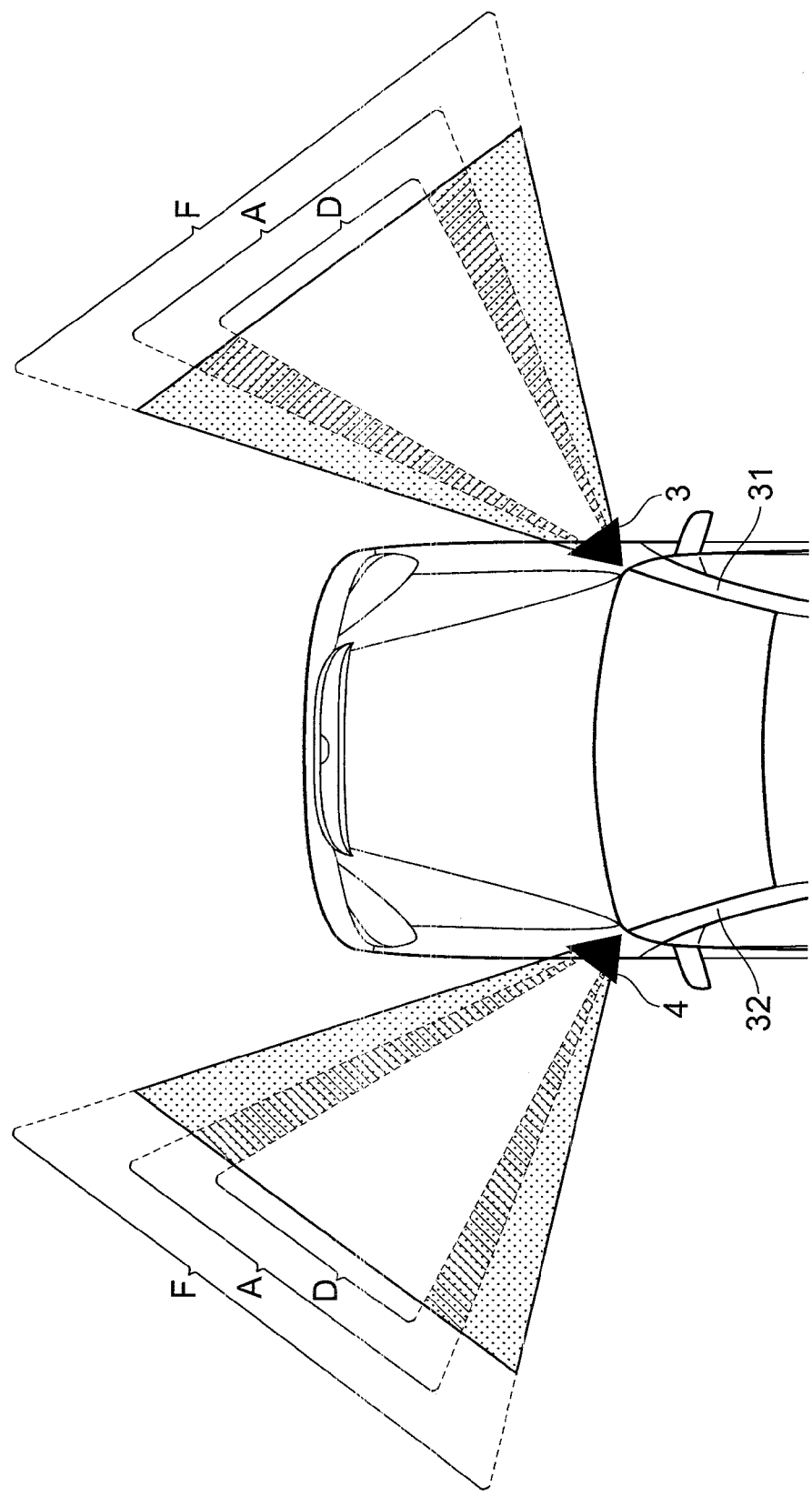
FIG. 2 is a plan view of a vehicle with the blind spot display device of the invention mounted therein.
Figure 3:
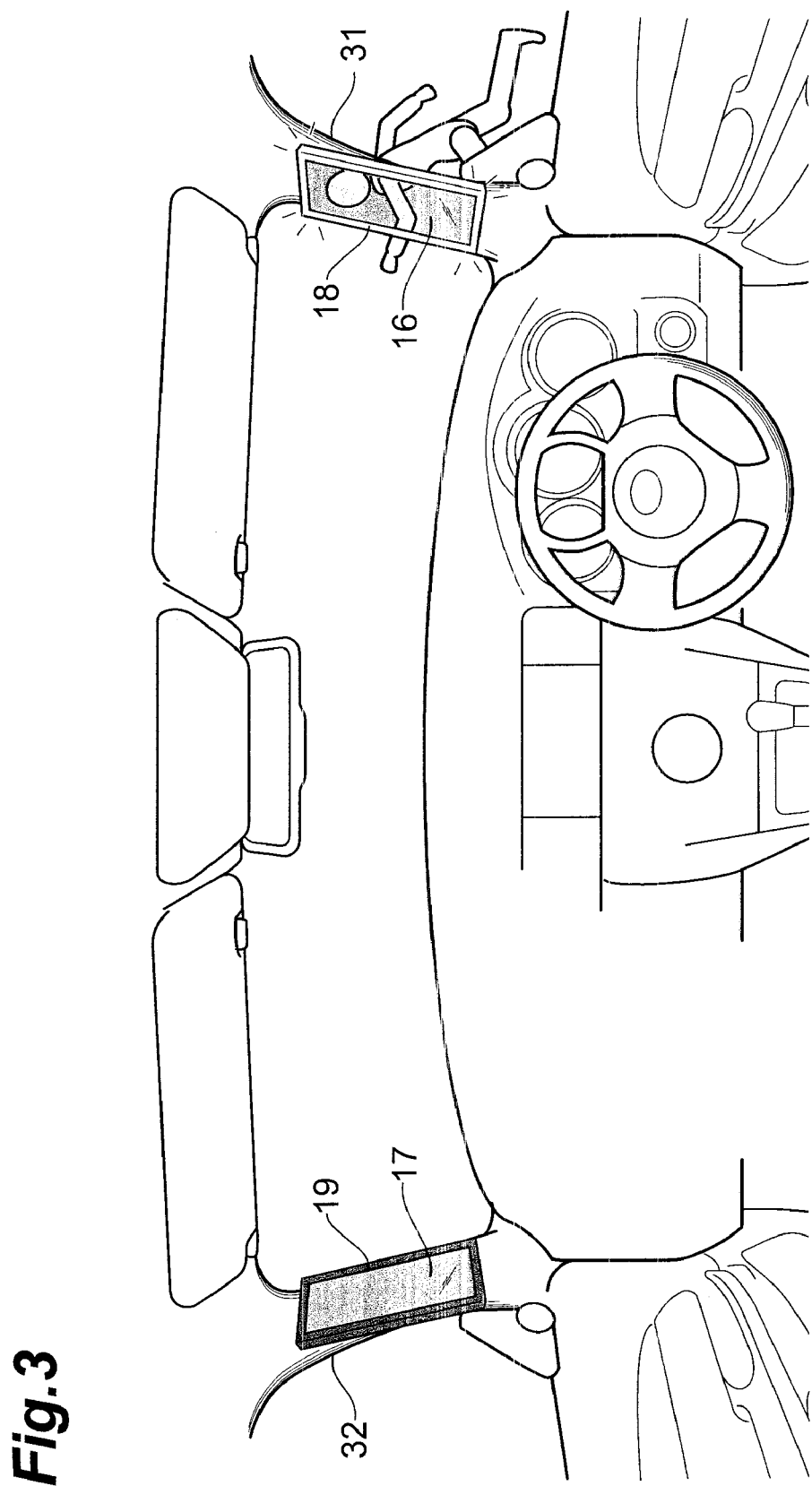
FIG. 3 is a diagram showing the internal state of the vehicle with the blind spot display device of the invention mounted therein.

FIG. 1 is a diagram showing the block configuration of a blind spot display device according to an embodiment of the invention. FIG. 2 is a plan view of a vehicle with the blind spot display device of the invention mounted therein. FIG. 3 is a diagram showing the internal state of the vehicle with the blind spot display device of the invention mounted therein.

As shown in FIG. 1, a blind spot display device (blind spot display device, driving support device) 1 includes an ECU (Electronic Control Unit) 2, a right camera 3, a left camera 4, a blinker state detection section 6, a vehicle speed detection section 7, a steering angle detection section 8, a yaw rate detection section 9, a lateral acceleration detection section 11, a brightness detection section 12, a shift position detection section 13, an in-vehicle switch 14, a right display (image display unit, transmitting unit) 16, a left display (image display unit, transmitting unit) 17, a right attention drawing section (attention drawing unit) 18, and a left attention drawing section (attention drawing unit) 19.

The right camera 3 and the left camera 4 have a function of acquiring the images of blind spot areas of left and right front pillars. The blind spot areas refer to blind spot areas outside the vehicle caused by the field of view of the driver being blocked by the left and right front pillars. As shown in FIG. 2, the right camera 3 and the left camera 4 are respectively constituted by CMOS cameras or the like attached to right and left front pillars 31 and 32 outside the vehicle. The right camera 3 and the left camera 4 have a function of acquiring an image within the range of an photographing view angle F and outputting the acquired image to the ECU 2. The right camera 3 is fixed to the front pillar 31, and the left camera 4 is fixed to the front pillar 32. As described below, the camera angle adjustment of the right camera 3 and the left camera 4 is made by software through image processing in the ECU 2.

Returning to FIG. 1, the blinker state detection section 6 has a function of detecting on/off of a blinker switch inside the vehicle to detect the blink states of left and right blinkers of the vehicle. The vehicle speed detection section 7 has a function of measuring, for example, the number of rotations of the wheel to detect the vehicle speed. The steering angle detection section 8 has a function of measuring the rotation angle of a steering shaft to detect the steering angle of a steering wheel. The yaw rate detection section 9 has a function of detecting a yaw rate applied to the vehicle. The lateral acceleration detection section 11 has a function of detecting a force toward the inside of the vehicle at the time of turning-round, that is, a lateral acceleration. The brightness detection section 12 has a function of detecting brightness inside the vehicle. The shift position detection section 13 has a function of detecting the shift position of a shift lever of the vehicle. Each detection section has a function of outputting the acquired detection result to the ECU 2.

The in-vehicle switch 14 is operated when the driver manually conducts the camera angle adjustment of the right camera 3 and the left camera 4. The in-vehicle switch 14 can also be used as a switch for a side mirror, for example, when a switch for switching a side mirror opening/closing mode and a camera angle adjustment mode is attached to a switch for a side mirror.

The right display 16 and the left display 17 have a function of displaying the image of the blind spot area outside the vehicle. As shown in FIG. 3, the right display 16 and the left display 17 are constituted by liquid crystal displays or the like respectively provided at the front pillars 31 and 32 inside the vehicle. The right display 16 and the left display 17 display images within the range of a display area D from among the images acquired by the right camera 3 and the left camera 4. The right display 16 and the left display 17 can also display images within a display area adjustable range A according to the camera angle adjustment (see FIG. 2). The right display 16 and the left display 17 have a function of switching display and non-display of the images on the basis of signals received from the ECU 2. Examples of a switching pattern of display/non-display include a pattern in which both displays perform display, a pattern in which only one display performs display, and a pattern in which both displays are put in a non-display state.

The right attention drawing section 18 and the left attention drawing section 19 have a function of drawing the attention of the driver such that the driver looks at an image displayed on the right display 16 or the left display 17. The right attention drawing section 18 and the left attention drawing section 19 are respectively constituted by, for example, providing blinkable areas at the outer periphery of the right display 16 and the left display 17. Alternatively, the right attention drawing section 18 and the left attention drawing section 19 may be constituted by surrounding the outer periphery of the right display 16 and the left display 17 with blinkable frame-shaped displays. Further, the right attention drawing section 18 and the left attention drawing section 19 may be constituted by providing blinkable lamps in the vicinity of the right display 16 and the left display 17. When the corresponding displays display images, the right attention drawing section 18 and the left attention drawing section 19 blink at predetermined timing on the basis of signals received from the ECU 2, drawing the attention of the driver.

As shown in FIG. 1, the ECU 2 is an electronic control unit which performs overall control of the device. The ECU 2 is mainly constituted by, for example, a CPU, and includes a ROM, a RAM, an input signal circuit, an output signal circuit, a power supply circuit, and the like. The ECU 2 has a camera angle automatic adjustment section 21, a camera angle manual adjustment section 22, an obstacle detection section 23, a luminance control section 24, a traveling state estimation section 26, a display/non-display control section 27, and an attention drawing control section 28.

The camera angle automatic adjustment section 21 has a function of automatically adjusting the camera angles of the right camera 3 and the left camera 4. Specifically, the camera angle automatic adjustment section 21 performs image processing for the images within the range of the photographing view angle F acquired from the right camera 3 and the left camera 4, and adjusts the display areas D displayed on the right display 16 and the left display 17 within the display area adjustable range A (see FIG. 2). The automatic adjustment is performed on the basis of the head position of the driver estimated from the side mirror position of the vehicle and the seat position. Alternatively, the automatic adjustment is performed on the basis of the camera angle stored in the memory of the power seat in advance. Thus, images which are consecutive to the actual field of view are displayed on the right display 16 and the left display 17 without causing the driver to perform complicated settings.

The camera angle manual adjustment section 22 has a function of performing the camera angle adjustment of the right camera 3 and the left camera 4 on the basis of the driver's operation of the in-vehicle switch 14. The specific camera angle adjustment is the same as the processing by the camera angle automatic adjustment section 21.

The obstacle detection section 23 has a function of detecting an obstacle in the blind spot area outside the vehicle. Specifically, the obstacle detection section 23 analyzes the images acquired by the right camera 3 and the left camera 4 to detect whether or not an obstacle is present in the images within the range of the photographing view angle F. When an obstacle is present in the images within the range of the photographing view angle F, the obstacle detection section 23 detects the position of the obstacle. The obstacle detection section 23 has a function of outputting the detection result to the attention drawing control section 27.

The luminance control section 24 has a function of automatically adjusting the luminance of the right display 16 and the left display 17 on the basis of brightness information inside the vehicle detected by the brightness detection section 12 so as not to interfere with driving of the driver. The luminance control section 24 has a function of outputting control signals to the right display 16 and the left display 17.

The traveling state estimation section 26 has a function of estimating the traveling state of the vehicle. Specifically, the traveling state estimation section 26 estimates, on the basis of the detection results from the respective detection sections, whether or not the vehicle is turning round, and when the vehicle is turning round, ascertains which direction the vehicle is traveling, whether or not the vehicle is in a high-speed straight-traveling state, whether or not the vehicle is in a low-speed state, or whether or not the vehicle is in a reversing state. The traveling state estimation section 26 has a function of outputting the estimation result to the display/non-display control section 27 and the attention drawing control section 28.

The display/non-display control section 27 has a function of controlling switching of display and non-display of the right display 16 and the left display 17 on the basis of the estimation result of the traveling state estimation section 26. The display/non-display control section 27 has a function of outputting control signals to the right display 16 and the left display 17.

The attention drawing control section 28 has a function of controlling the blink timing of the right attention drawing section 18 and the left attention drawing section 19 on the basis of the estimation result of the traveling state estimation section 26. The attention drawing control section 28 has a function of outputting control signals to the right attention drawing section 18 and the left attention drawing section 19.

The working of the blind spot display device 1 according to this embodiment will be described with reference to FIGS. 4 to 12.

Figure 4:
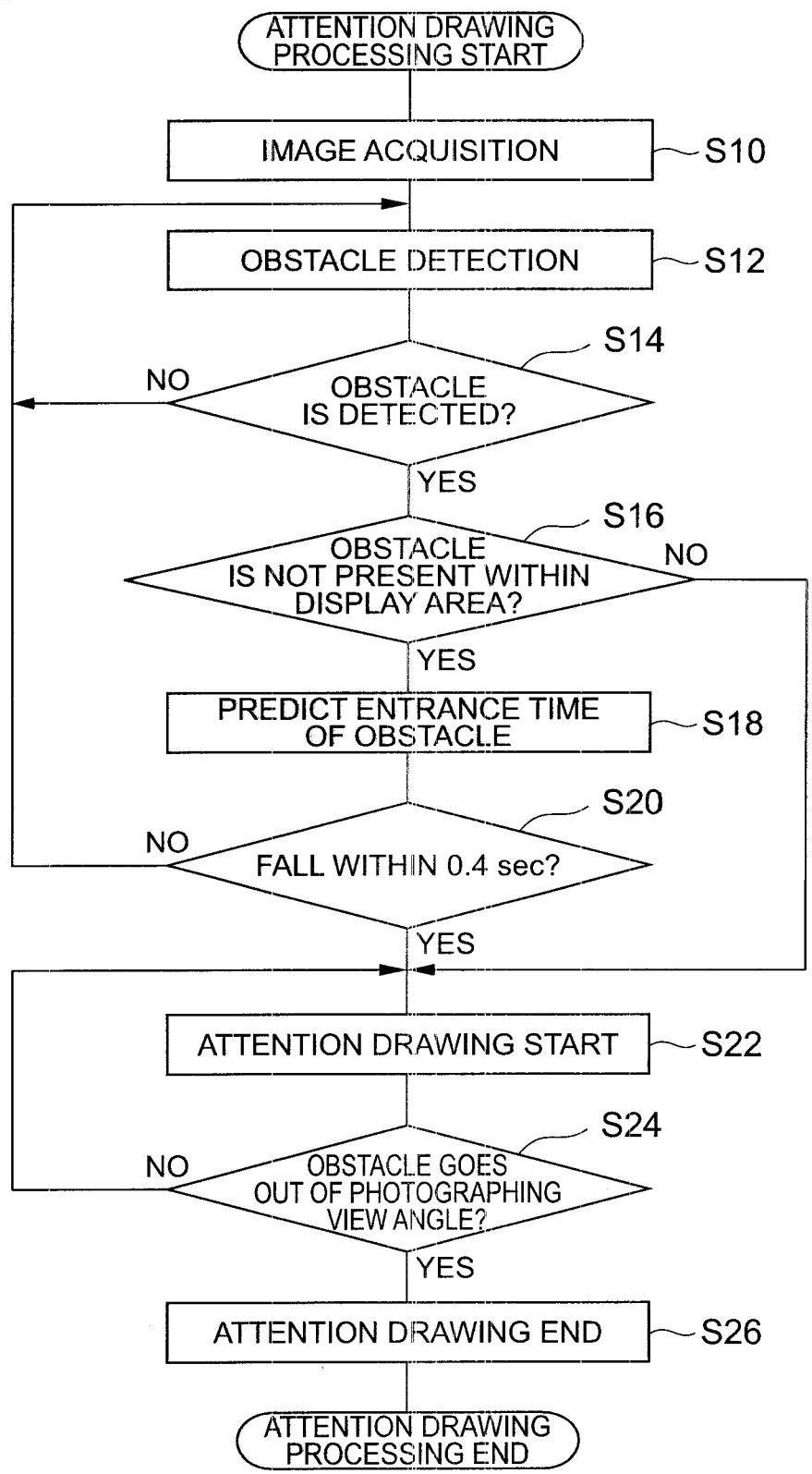
FIG. 4 is a flowchart showing attention drawing processing in the blind spot display device according to this embodiment.

FIG. 4 is a flowchart showing attention drawing processing in the blind spot display device 1 according to this embodiment. The ECU 2 repeatedly performs the processing shown in FIG. 4 at predetermined timing while the right display 16 or the left display 17 is displaying an image. The ECU 2 interrupts the processing of FIG. 4 in the course of the processing when no image is displayed. When the processing of FIG. 4 is interrupted, if the right attention drawing section 18 or the left attention drawing section 19 is blinking, the blinking is also ended.

As shown in FIG. 4, the blind spot display device 1 starts the processing from image acquisition processing for acquiring the image of the blind spot area (S10). The processing of S10 is executed by the obstacle detection section 23, in which an image within the range of the photographing view angle F acquired by the right display 16 or the left display 17 is acquired. If the processing of S10 ends, the blind spot display device 1 progresses to obstacle detection processing (S12).

The processing of S12 is executed by the obstacle detection section 23, in which the image acquired in S10 is analyzed to detect an obstacle present within the range of the photographing view angle F, and the position of the detected obstacle is detected. If the processing of S12 ends, the blind spot display device 1 progresses to obstacle presence determination processing (S14).

The processing of S14 is executed by the attention drawing control section 28, in which it is determined whether an obstacle is present within the range of the photographing view angle F or not with reference to the detection result by the processing of S12. When it is determined in the processing of S14 that no obstacle is present, the blind spot display device 1 progresses to the obstacle detection processing (S12) again. Meanwhile, when it is determined that an obstacle is present, the blind spot display device 1 progresses to obstacle presence position determination processing (S16).

The processing of S16 is executed by the attention drawing control section 28, in which it is determined whether an obstacle is present within the display area D or not with reference to the detection result in S12. When it is determined in the processing of S16 that an obstacle is present within the display area, the blind spot display device 1 progresses to attention drawing processing (S22). The processing of S22 is executed by the attention drawing control section 28, in which a control signal is output to the right attention drawing section 18 or the left attention drawing section 19 to cause blinking, drawing the attention of the driver such that the driver looks at an image.

Meanwhile, when it is determined in the processing of S16 that an obstacle is not present within the display area, the blind spot display device 1 progresses to entrance time prediction processing (S18). The processing of S18 is executed by the attention drawing control section 28, in which the traveling direction of the vehicle and the required time until an obstacle enters the display area D are predicted on the basis of the position of the obstacle detected in S12, the vehicle speed detected by the vehicle speed detection section 7, the steering angle detected by the steering angle detection section 8, and the yaw rate detected by the yaw rate detection section 9. If the processing of S18 ends, the blind spot display device 1 progresses to entrance time determination processing (S20).

The processing of S20 is executed by the attention drawing control section 28, in which it is determined on the basis of the prediction result in S18 whether or not an obstacle enters the display area. D within a predetermined time. Specifically, the predetermined time is about 0.4 seconds. When is determined in the processing of S20 that an obstacle does not enter, the blind spot display device 1 progresses to the obstacle detection processing (S12) again. When it is determined that an obstacle enters, the blind spot display device 1 progresses to the attention drawing processing (S22).

In the processing of S22, after the right attention drawing section 18 or the left attention drawing section 19 is made to blink, the blind spot display device 1 progresses to obstacle confirmation processing (S24). The processing of S24 is executed by the obstacle detection section 23, in which it is determined whether or not the obstacle detected in S12 goes out of the range of the photographing view angle F. When it is determined in S24 that the obstacle does not go out of the range of the photographing view angle F, the blind spot display device 1 progresses to the attention drawing processing again (S22). Meanwhile, when it is determined that the obstacle goes out of the range of the photographing view angle F, the blind spot display device 1 progresses to attention drawing stoppage processing in which the blinking of the right attention drawing section 18 or the left attention drawing section 19 is stopped (S26). After the processing of S26 ends, the processing of FIG. 4 ends and the blind spot display device 1 returns to the processing of S10 again.

As described above, the blind spot display device 1 according to the invention draws the attention of the driver on the basis of an obstacle present in the blind spot area, and when no obstacle is present, does not draw the attention of the driver. Therefore, it is possible to prevent the attentiveness of the driver from being decreased due to unnecessary drawing of attention.

Next, display switching processing will be described with reference to FIGS. 7 to 12, in which display and non-display of the right display 16 and the left display 17 are switched on the basis of the traveling state of the vehicle. With regard to the display switching processing, any one of FIGS. 7 to 12 may be applied selectively, or a combination thereof may be applied.

Figure 5:
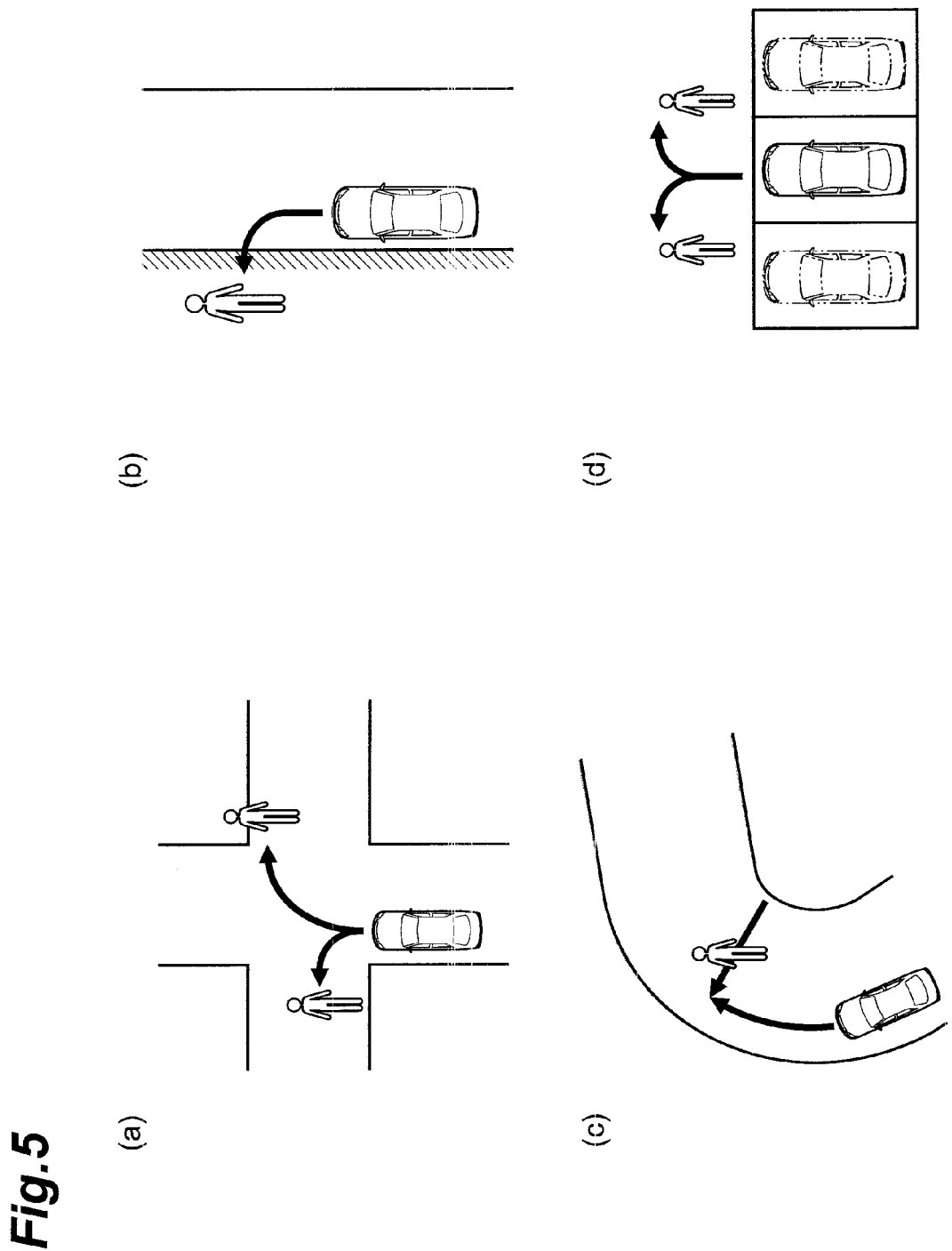
FIG. 5 is a diagram showing the traveling state of the vehicle.
Figure 6:
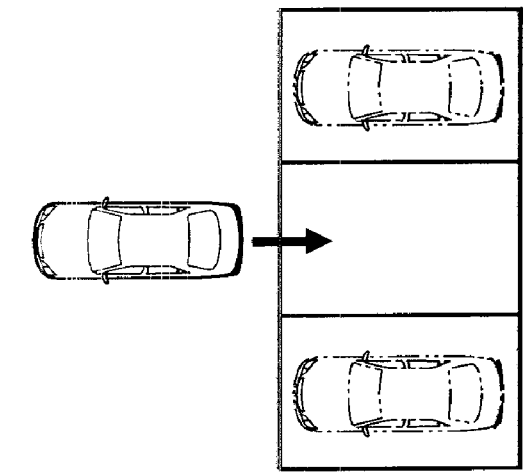
FIG. 6 is a diagram showing the traveling state of the vehicle.
Figure 7:
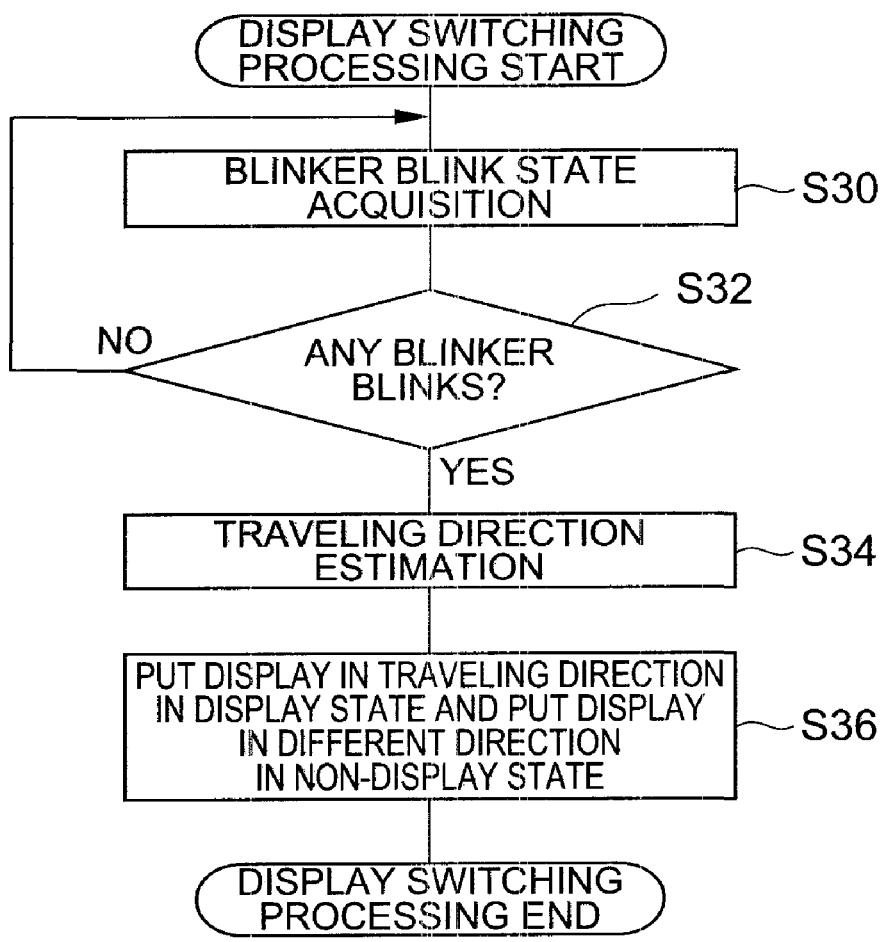
FIG. 7 is a flowchart showing display switching processing in the blind spot display device according to this embodiment.

FIG. 7 is a flowchart showing display switching processing by the blind spot display device 1 according to this embodiment when the vehicle is turning left/right. The processing of FIG. 7 is repeatedly executed at predetermined timing in the ECU 2, for example, as shown in FIG. 5(*a*), when the vehicle turns right or left at an intersection, or as shown in FIG. 5(*b*), when the vehicle goes out of a road.

As shown in FIG. 7, the blind spot display device 1 starts the processing from blinker blink state acquisition processing in which the blink state of the blinker is acquired (S30). The processing of S30 is executed by the vehicle traveling state estimation section 26, in which the detection result from the blinker state detection section 6 is received to acquire the blink state of the blinker. If the processing of S30 ends, the blind spot display device 1 progresses to blinker blink state determination processing (S32).

The processing of S32 is executed by the vehicle traveling state estimation section 26, in which it is determined on the basis of the blinker blink state acquired in S30 whether or not the left or right blinker is blinking. When it is determined in S32 that no blinkers are blinking, the blind spot display device 1 progresses to the blinker blink state acquisition processing (S30) again.

Meanwhile, when it is determined in S32 that the left or right blinker is blinking, the blind spot display device 1 progresses to traveling direction estimation processing (S34). The processing of S34 is executed by the vehicle traveling state estimation section 26, in which the traveling direction of the vehicle is estimated with reference to which blinker being blinking on the basis of the blinker blink state acquired in S30. Specifically, when the right blinker is blinking, the vehicle traveling state estimation section 26 estimates that the traveling direction is right, and when the left blinker is blinking, the vehicle traveling state estimation section 26 estimates that the traveling direction is left. If the processing of S34 ends, the blind spot display device 1 progresses to display control processing (S36).

The processing of S36 is executed by the display/non-display control section 27 and the attention drawing control section 28, in which control of the right display 16 and the left display 17 is performed and control of the right attention drawing section 18 and the left attention drawing section 19 is performed on the basis of the determination result in S34. The display/non-display control section 27 switches display/non-display of the right display 16 and the left display 17 such that an image is displayed on the display in the traveling direction, and the other display is put in the non-display state. The attention drawing control section 28 controls the right attention drawing section 18 and the left attention drawing section 19 in accordance with switching of display and non-display of the right display 16 and the left display 17. Specifically, when it is estimated that the traveling direction is right, the display/non-display control section 27 displays an image on the right display 16 and puts the left display 17 in the non-display state. When it is estimated that the traveling direction is left, the display/non-display control section 27 displays an image on the left display 17 and puts the right display 16 in the non-display state. After the processing of S36 ends, the processing of FIG. 7 ends and blind spot display device 1 returns to the processing of S30 again.

Figure 8:
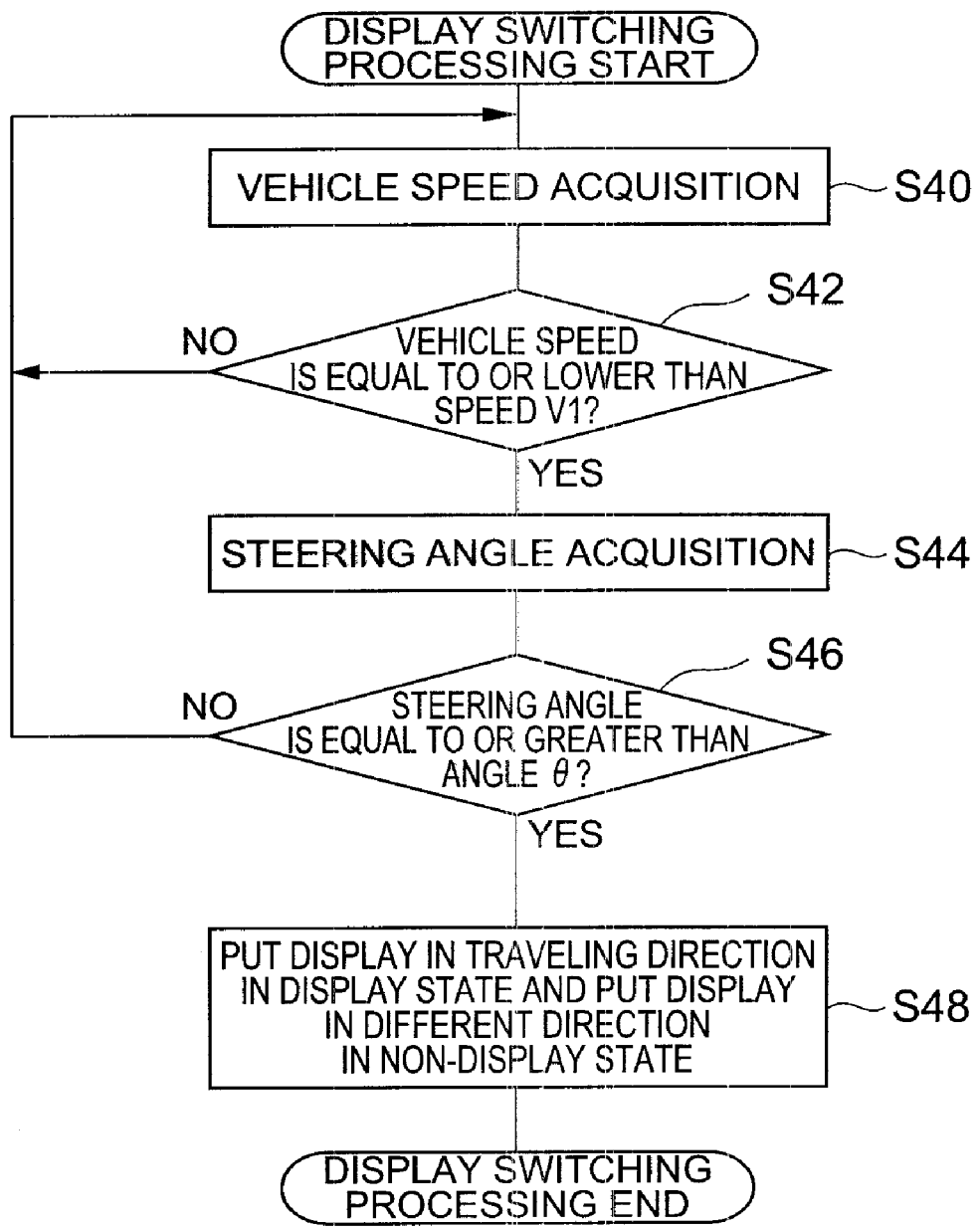
FIG. 8 is a flowchart showing display switching processing in the blind spot display device according to this embodiment.

FIG. 8 is a flowchart showing display switching processing by the blind spot display device 1 according to this embodiment when the vehicle is in a low-speed steering state. The processing of FIG. 8 is also repeatedly executed at predetermined timing in the ECU 2 mainly in a case shown in FIG. 5(a) or 5(b).

As shown in FIG. 8, the blind spot display device 1 starts the processing from vehicle speed acquisition processing in which the vehicle speed is acquired (S40). The processing of S40 is executed by the vehicle traveling state estimation section 26, in which the detection result from the vehicle speed detection section 7 is received to acquire the vehicle speed. If the processing of S40 ends, the blind spot display device 1 progresses to vehicle speed determination processing (S42).

The processing of S42 is executed by the vehicle traveling state estimation section 26, in which it is determined whether or not the vehicle speed is equal to or lower than a predetermined vehicle speed V1 set in advance. If it is determined in S42 that the vehicle speed is higher than the speed V1, the blind spot display device 1 progresses to the vehicle speed acquisition processing (S40) again.

Meanwhile, when it is determined in S42 that the vehicle speed is equal to or lower than the speed V1, the blind spot display device 1 progresses to steering angle acquisition processing (S44). The processing of S44 is executed by the vehicle traveling state estimation section 26, in which the detection result from the steering angle detection section 8 is received to acquire the steering angle. If the processing of S44 ends, the blind spot display device 1 progresses to steering angle determination processing (S46).

The processing of S46 is executed by the vehicle traveling state estimation section 26, in which it is determined whether or not the absolute value of the steering angle is equal to or greater than a predetermined angle θ set in advance, thus estimating the traveling direction. If it is determined in S46 that the absolute value of the steering angle is smaller than the angle θ, it is estimated that the traveling direction is forward, and the blind spot display device 1 progresses to the vehicle speed acquisition processing (S40) again.

Meanwhile, if it is determined in S46 that the absolute value of the steering angle is equal to or greater than the angle θ, it is estimated that the steered direction is the traveling direction, and the blind spot display device 1 progresses to display control processing (S48). The processing of S48 is executed by the display/non-display control section 27 and the attention drawing control section 28, in which switching of display and non-display of the right display 16 and the left display 17 is performed and control of the right attention drawing section 18 and the left attention drawing section 19 is performed on the basis of the estimation result of S46 such that art image is displayed on the display in the traveling direction and the other display is in the non-display state. Specifically, when it is estimated that the traveling direction is right, the display/non-display control section 27 displays an image on the right display 16 and puts the left display 17 in the non-display state. When it is estimated that the traveling direction is left, the display/non-display control section 27 displays an image on the left display 17 and puts the right display 16 in the non-display state. After the processing of S48 ends, the processing of FIG. 8 ends and the blind spot display device 1 returns to the processing of S40 again.

Figure 9:
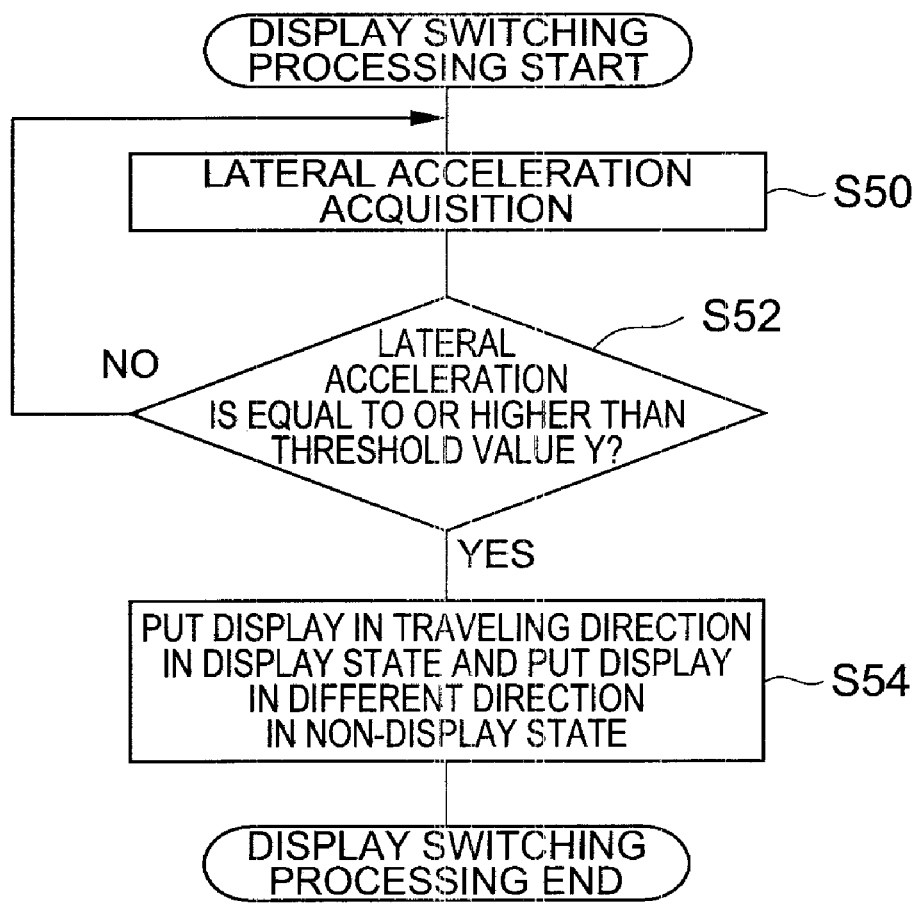
FIG. 9 is a flowchart showing display switching processing in the blind spot display device according to this embodiment.

FIG. 9 is a flowchart showing display switching processing by the blind spot display device 1 according to this embodiment when the vehicle is turning round at high speed. The processing of FIG. 9 is repeatedly executed at predetermined timing in ECU 2, for example, as shown in FIG. 5(c), when the vehicle is turning round with a sharp curve.

As shown in FIG. 9, the blind spot display device 1 starts the processing from lateral acceleration acquisition processing in which a lateral acceleration applied to on the vehicle is acquired (S50). The processing of S50 is executed by the vehicle traveling state estimation section 26, in which the detection result from the lateral acceleration detection section 11 is received to acquire the lateral acceleration. If the processing of S50 ends, the blind spot display device 1 progresses to lateral acceleration determination processing (S52).

The processing of S52 is executed by the vehicle traveling state estimation section 26, in which it is determined whether or not the lateral acceleration acquired in S50 is equal to or higher than a threshold value Y set in advance, estimating the traveling direction. When it is determined in S52 that the lateral acceleration is lower than the threshold value Y, the blind spot display device 1 progresses to the lateral acceleration processing (S50) again.

Meanwhile, when it is determined in S52 that the lateral acceleration is equal to or higher than the threshold value Y, it is estimated that the direction in which the lateral acceleration is applied is the traveling direction, and the blind spot display device 1 progresses to display control processing (S54). The processing of S54 is executed by the display/non-display control section 27 and the attention drawing control section 28, in which switching of display and non-display of the right display 16 and the left display 17 is performed and control of the right attention drawing section 18 and the left attention drawing section 19 is performed on the basis of the estimation result of S52 such that an image is displayed on the display in the traveling direction and the other display is put in the non-display state. Specifically, when it is estimated that the traveling direction is right, the display/non-display control section 27 displays an image on the right display 16 and puts the left display 17 in the non-display state. When it is estimated that the traveling direction is left, the display/non-display control section 27 displays an image on the left display 17 and puts the right display 16 in the non-display state. After the processing of S54 ends, the processing of FIG. 9 ends and the blind spot display device 1 returns to the processing of S50 again.

As described above, according to the display switching processing shown in FIGS. 7 to 9, the blind spot display device 1 displays an image on the display in the estimated traveling direction, reliably ensuring the field of view in the traveling direction without imposing a driving burden on the driver, such as body movement or weight shifting so as to ensure the field of view, when the vehicle turns right or left, or when the vehicle makes a sharp curve. This effect enables significant reduction of the driving burden on a driver of advanced age. The blind spot display device 1 puts the other display in the non-display state, preventing the visual distraction of the driver due to display of unnecessary images and consequently preventing the attentiveness of the driver from being decreased.

Figure 10:
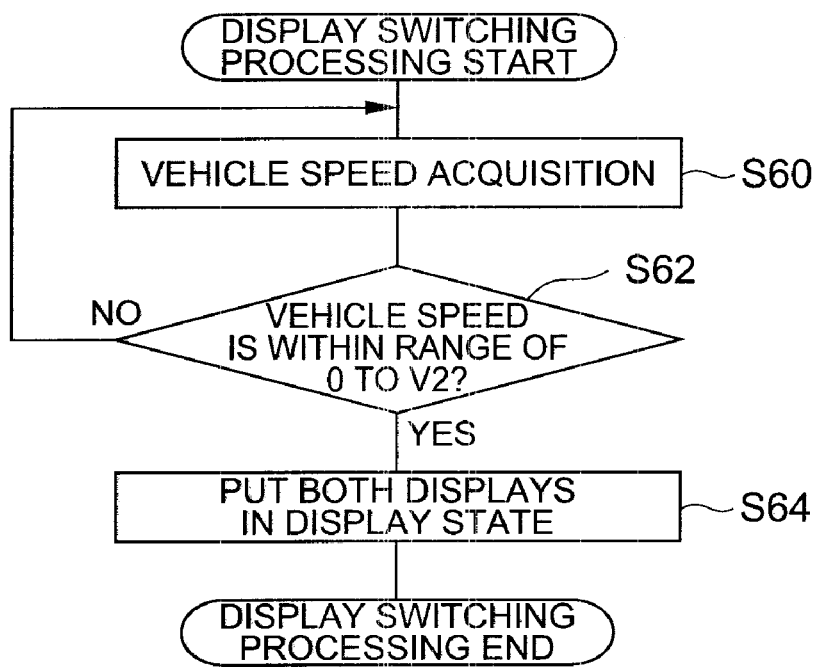
FIG. 10 is a flowchart showing display switching processing in the blind spot display device according to this embodiment.

FIG. 10 is a flowchart showing display switching processing by the blind spot display device 1 according to this embodiment when the vehicle is in a low-speed state. The processing of FIG. 10 is repeatedly executed at predetermined timing in the ECU 2, for example, as shown in FIG. 5(d), when the vehicle departs from a parking position.

As shown in FIG. 10, the blind spot display device 1 starts the processing from vehicle speed acquisition processing in which the vehicle speed is acquired (S60). The processing of S60 is executed by the vehicle traveling state estimation section 26, in which the detection result from the vehicle speed detection section 7 is received to acquire the vehicle speed. If the processing of S60 ends, the blind spot display device 1 progresses to vehicle speed determination processing (S62).

The processing of S62 is executed by the vehicle traveling state estimation section 26, in which it is determined whether or not the vehicle speed acquired in S60 is within a range of 0 km/h to a predetermined speed V2. When it is determined in S62 that the vehicle speed is higher than V2, the blind spot display device 1 progresses to the vehicle speed acquisition processing (S60) again.

Meanwhile, when it is determined in S62 that the vehicle speed is within the range of 0 to the speed V2, it is estimated that the vehicle is in the low-speed state, and the blind spot display device 1 progresses to display control processing (S64). The processing of S64 is executed by the display/non-display control section 27 and the attention drawing control section 28, in which switching of display and non-display of the right display 16 and the left display 17 is performed and control of the right attention drawing section 18 and the left attention drawing section 19 is performed on the basis of the estimation result of S62. Specifically, images are displayed on both displays. After the processing of S64 ends, the processing of FIG. 10 ends and the blind spot display device 1 returns to the processing of S60 again.

As described above, according to the display switching processing shown in FIG. 10, for example, when the vehicle departs from the parking position, that is, when the vehicle is in the low-speed state, it is necessary for the driver to check safety on the left and right sides. When the vehicle is in the low-speed state, the blind spot display device 1 displays the images on both displays, ensuring safety at the time of departure.

Figure 11:
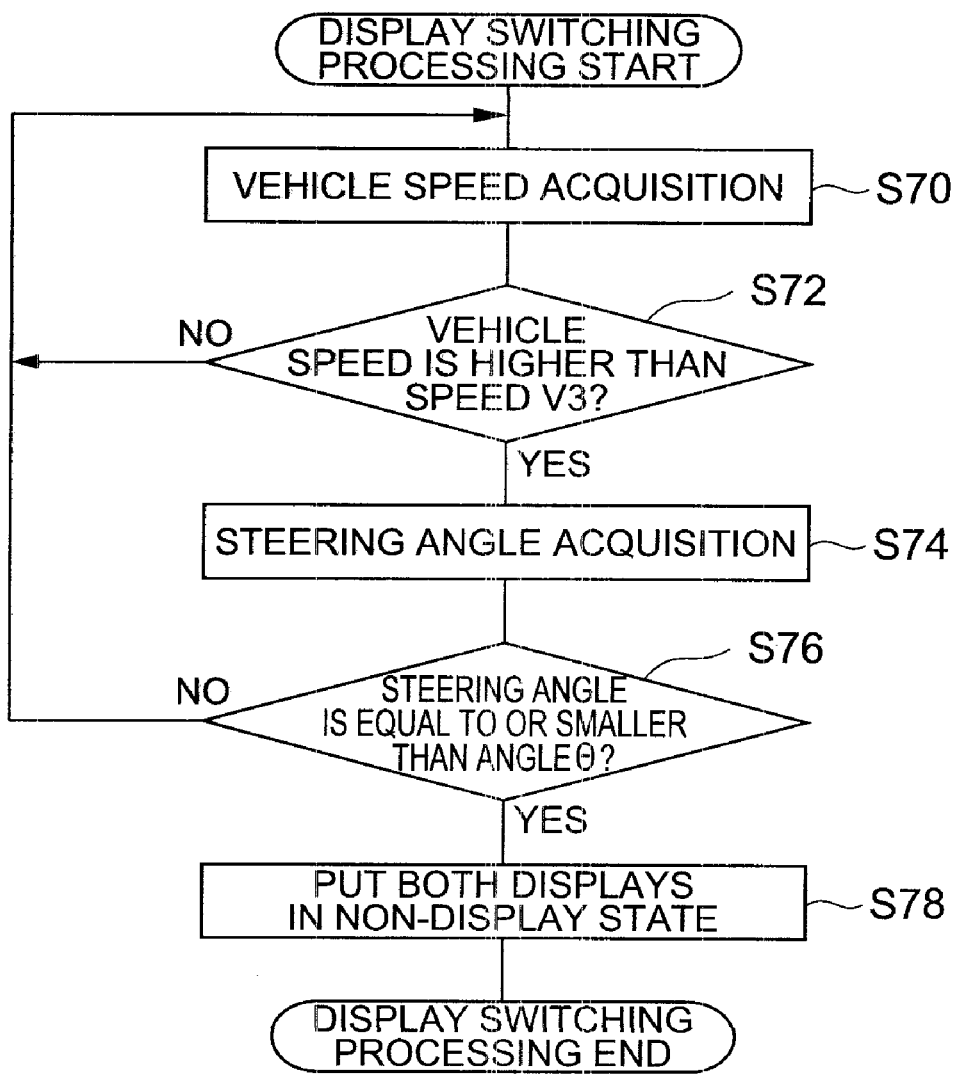
FIG. 11 is a flowchart showing display switching processing in the blind spot display device according to this embodiment.

FIG. 11 is a flowchart showing display switching processing by the blind spot display device 1 according to this embodiment when the vehicle is in a high-speed straight-traveling state. The processing of FIG. 11 is repeatedly executed at predetermined timing in the ECU 2, for example, as shown in FIG. 6(b), when the vehicle travels straight forward.

As shown in FIG. 11, the blind spot display device 1 starts the processing from vehicle speed acquisition processing in which the vehicle speed is acquired (S70). The processing of S70 is executed by the vehicle traveling state estimation section 26, in which the detection result from the vehicle speed detection section 7 is received to acquire the vehicle speed. If the processing of S70 ends, the blind spot display device 1 progresses to vehicle speed determination processing (S72).

The processing of S72 is executed by the vehicle traveling state estimation section 26, in which it is determined whether the vehicle speed is higher than a predetermined speed V3 set in advance. If it is determined in S72 that the vehicle speed is equal to or lower than the speed V3, the blind spot display device 1 progresses to the vehicle speed acquisition processing (S70) again.

Meanwhile, when it is determined in S72 that the vehicle speed is higher than the speed V3, the blind spot display device 1 progresses to steering angle acquisition processing (S74). The processing of S74 is executed by the vehicle traveling state estimation section 26, in which the detection result from the steering angle detection section 8 is received to acquire a steering angle. If the processing of S74 ends, the blind spot display device 1 progresses to steering angle determination processing (S76).

The processing of S76 is executed by the vehicle traveling state estimation section 26, in which it is determined whether or not the absolute value of the steering angle is equal to or smaller than a predetermined angle $\Theta$ set in advance, thus estimating the traveling direction. If it is determined in S76 that the absolute value of the steering angle is greater than the angle $\Theta$, the blind spot display device 1 progresses to the vehicle speed acquisition processing (S70) again.

Meanwhile, if it is determined in S76 that the absolute value of the steering angle is equal to or smaller than the angle $\Theta$, it is estimated that the vehicle is in the high-speed straight-traveling state, and the blind spot display device 1 progresses to display control processing (S78). The processing of S78 is executed by the display/non-display control section 27 and the attention drawing control section 28, in which switching of display and non-display of the right display 16 and the left display 17 is performed and control of the right attention drawing section 18 and the left attention drawing section 19 is performed on the basis of the estimation result of S76. Specifically, both displays are put in the non-display state. After the processing of S78 ends, the processing of FIG. 11 ends and the blind spot display device 1 returns to the processing of S70 again.

When the vehicle is in the high-speed straight-traveling state, the contents of the images on the displays are switched at high speed, and it is difficult to discriminate between the contents displayed on the displays. However, the blind spot display device 1 executes the display switching processing shown in FIG. 11 and when the vehicle is in the high-speed straight-traveling state, puts both displays in the non-display state, enabling the driver to concentrate his/her attention on driving.

Figure 12:
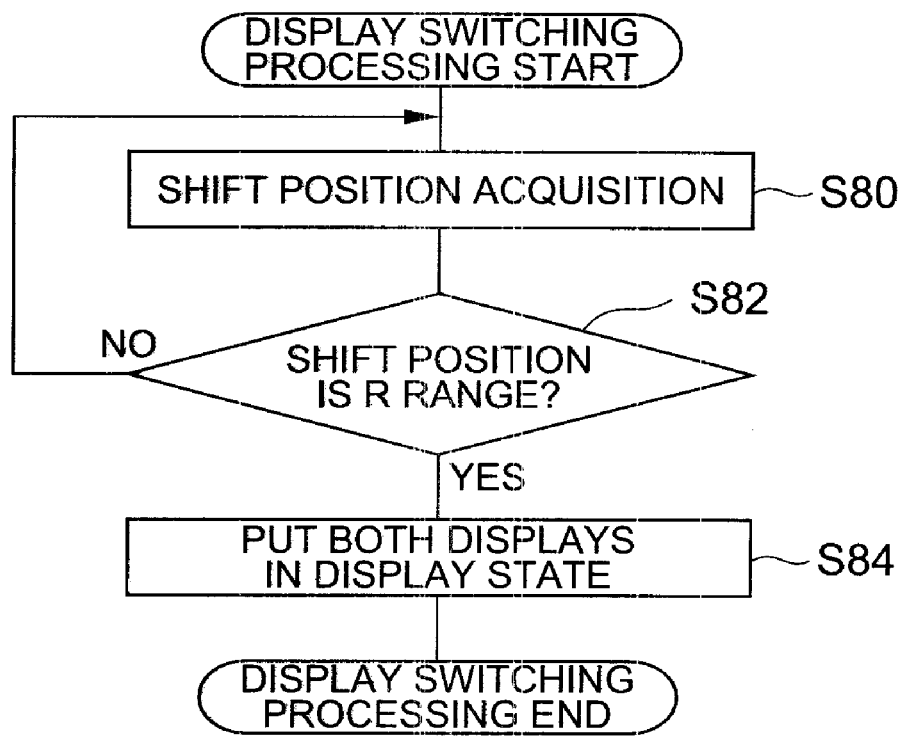
FIG. 12 is a flowchart showing display switching processing in the blind spot display device according to this embodiment.

FIG. 12 is a flowchart showing display switching processing by the blind spot display device 1 of this embodiment when the vehicle is in a reversing state. The processing of FIG. 12 is repeatedly executed at predetermined timing in the ECU 2, for example, as shown in FIG. 6(a), when the vehicle is being parked.

As shown in FIG. 12, the blind spot display device 1 starts the processing from shift position acquisition processing in which the shift position of the vehicle is acquired (S80). The processing of S80 is executed by the vehicle traveling state estimation section 26, in which the detection result from the shift position detection section 13 is received to acquire the shift position. If the processing of S80 ends, the blind spot display device 1 progresses to shift position determination processing (S82).

The processing of S82 is executed by the vehicle traveling state estimation section 26, in which it is determined whether or not the shift position acquired in S80 is the R range. When it is determined in S82 that the shift position is not the R range, the blind spot display device 1 progresses to the shift position acquisition processing (S80) again.

Meanwhile, when it is determined in S82 that the shift position is the R range, it is estimated that the vehicle is in the reversing state, and the blind spot display device 1 progresses to display control processing (S84). The processing of S84 is executed by the display/non-display control section 27 and the attention drawing control section 28, in which switching of display and non-display of the right display 16 and the left display 17 is performed and control of the right attention drawing section 18 and the left attention drawing section 19 is performed on the basis of the estimation result of S82. Specifically, both displays are put in the non-display state. After the processing of S84 ends, the processing of FIG. 12 ends and the blind spot display device 1 returns to the processing of S80 again.

When the vehicle is in the reversing state, the driver is looking backward. Thus, the blind spot display device 1 performs the display switching processing shown in FIG. 12 to put both displays in the non-display state, suppressing wasteful power consumption.

As described above, according to the blind spot display device 1 of this embodiment, the right display 16 and the left display 17 switch display and non-display of the image of the blind spot area on the basis of the traveling state of the vehicle estimated by the traveling state estimation section 26. The right attention drawing section 18 or the left attention drawing section 19 corresponding to the display displaying an image draws the attention of the driver. Thus, depending on the traveling state of the vehicle, when it is not necessary to display the images on the displays, the blind spot display device 1 puts both displays in the non-display state, ensuring attention of the driver during driving. Meanwhile, only when it is necessary to display the images on the displays depending on the traveling state of the vehicle, the blind spot display device 1 displays the images on both displays and draws the attention of the driver, enabling the driver to check the images reliably. When it is necessary for the driver to look at the image on one display depending on the travelling state of the vehicle, the blind spot display device 1 displays the image only on the one display and draws the attention of the driver, enabling the driver to look at the image reliably. Meanwhile, the blind spot display device 1 puts the other unnecessary display in the non-display state, preventing the driver from being inattentive. Therefore, the blind spot display device 1 enables the driver to check the image of the blind spot area at required timing, and can prevent the visual distraction of the driver due to display of unnecessary images, ensuring that the driver is sufficiently attentive during driving.

The invention is not limited to the above-described embodiment.

Although the blind spot display device 1 of this embodiment switches the displays on the basis of the estimation of the traveling state estimation section 26, for example, switching control may be performed in consideration of the direction in which the driver is facing. Specifically, a camera is provided inside the vehicle to photograph the face of the driver, and the direction in which the driver is facing is acquired from the image. The blind spot display device may store a table shown in FIG. 13 in the memory of the ECU 2 in advance, may compare the switching pattern and the face direction of the driver based on the estimation result of the traveling state estimation section 26 with the table, and may switch the displays.

The display switching processing is not limited to those shown in FIGS. 7 to 12. That is, the above-described display switching processing may be appropriately combined depending on the traveling state of the vehicle. Specifically, when the vehicle speed is 0 km/n to a very slow speed, if the shift position is any one of the P, N, and D ranges, the blind spot display device displays the images on both displays. When the vehicle speed is the very slow speed to a slow speed, the blind spot display device displays the image only on the display corresponding to the blinker when it is blinking. When the vehicle speed is equal to or higher than the slow speed, if the distance of a curve estimated from the vehicle speed and the yaw rate is equal to or greater than a threshold value, the blind spot display device may perform display switching processing such that an image is displayed only on the display in the direction in which the vehicle is turning round.

In the above-described embodiment, the invention is applied to the blind spot display device in which the image of the blind spot area is displayed on the display provided at the pillar. However, the invention may be applied to a driving support device which notifies the driver of the state of the blind spot area by using a lamp or a horn (sound), instead of displaying the image on the pillar. The lamp or horn has a function of generating a blink signal or sound depending on the traveling state of the vehicle to transmit the state of the blind spot area. The lamp or horn has a function of switching transmission and non-transmission on the basis of the traveling state estimated by the traveling state estimation section 26. Therefore, the driving support device directs attention of the driver to the blind spot area at required timing, ensuring that the driver is sufficiently attentive during driving.

Although in the above-described embodiment, the front pillar has been described, the invention may be applied to a center pillar (B-pillar) or a rear pillar (C-pillar). For example, at the time of reversing, an image may be displayed on the center pillar or the rear pillar, or the state of the blind spot area may be issued by a lamp or a horn.

REFERENCE SIGNS LIST

1: blind spot display device (blind spot display device, driving support device), 2: ECU (traveling state estimation unit), 16: right display (image display unit, transmitting unit), 17: left display (image display unit, transmitting unit), 18:

right attention drawing section (attention drawing unit), 19: left attention drawing section (attention drawing unit), 31, 32: front pillar.

The invention claimed is:

1. A blind spot display device comprising:
   image display units which are respectively provided inside a pair of left and right front pillars in a vehicle, and display the image of a blind spot area outside the vehicle caused by the field of view of a driver being blocked by each front pillar;
   attention drawing units which are provided correspondingly to the image display units, and draw attention of the driver such that the driver looks at the image;
   a traveling state estimation unit which estimates the traveling state of the vehicle,
   wherein the image display units switch display and non-display of the image on the basis of the traveling state estimated by the traveling state estimation unit,
   the attention drawing unit corresponding to the image display unit which displays the image draws attention of the driver,
   the attention drawing unit draws attention of the driver on the basis of an obstacle present in the blind spot area, and
   the attention drawing unit draws attention of the driver on the basis of the time until the obstacle enters the blind spot area.

2. The blind spot display device according to claim 1, wherein the traveling state estimation unit estimates the traveling direction of the vehicle, the image display unit in the traveling direction displays the image, and the other image display unit does not display the image.

3. The blind spot display device according to claim 2, wherein the traveling state estimation unit estimates the traveling direction on the basis of the blink states of blinkers.

4. The blind spot display device according to claim 2, wherein the traveling state estimation unit estimates the traveling direction on the basis of a vehicle speed and a steeling angle.

5. The blind spot display device according to claim 2, wherein the traveling state estimation unit estimates the traveling direction on the basis of a lateral acceleration.

6. The blind spot display device according to claim 1,
   wherein, when the vehicle speed is lower than a predetermined threshold value, the traveling state estimation unit estimates that the vehicle is in a low-speed state, and
   wherein, when the traveling state estimation unit has estimated that the vehicle is in the low-speed state, the image display units display the image.

7. The blind spot display device according to claim 1,
   wherein, when the vehicle speed is equal to or higher than a predetermined threshold value, and the steering angle is equal to or smaller than a predetermined angle, the traveling state estimation unit estimates that the vehicle is in a high-speed straight-traveling state, and
   wherein when the traveling state estimation unit has estimated that the vehicle is in the high-speed straight-traveling state, the image display units do not display the image.

8. The blind spot display device according to claim 1, wherein the traveling state estimation unit estimates whether or not the vehicle is in a reversing state, and when the traveling state estimation unit has estimated that the vehicle is in the reversing state, the image display units do not display the image.

* * * * *